United States Patent [19]

Livick

[11] Patent Number: 4,807,927
[45] Date of Patent: Feb. 28, 1989

[54] SAFETY AUTO SEAT MOUNTED ADJUSTABLE BABY BASSINET SUNSHADER

[76] Inventor: Lester R. Livick, 15106 Beatty St., San Leandro, Calif. 94579

[21] Appl. No.: 41,068

[22] Filed: Mar. 17, 1987

[51] Int. Cl.⁴ .............................................. A47C 7/10
[52] U.S. Cl. .................................. 297/184; 297/255; 280/727; 296/78.1
[58] Field of Search ............... 297/184, 254, 255, 256, 297/191; 248/118, 118.3, 240, 242; 280/289 S, 727

[56] References Cited

U.S. PATENT DOCUMENTS

| | | | |
|---|---|---|---|
| 260,867 | 7/1882 | Heining | 297/254 |
| 1,299,827 | 4/1919 | Edwards | 297/255 |
| 1,351,746 | 9/1920 | Eberle | 297/255 |
| 1,546,768 | 7/1925 | West | 297/255 X |
| 2,359,599 | 10/1944 | Allen | 297/255 X |
| 2,461,367 | 2/1949 | Bonk | 297/255 |
| 2,512,806 | 6/1951 | Weiborn | 297/184 X |
| 2,974,718 | 3/1961 | Lawrence et al. | 297/256 |
| 3,169,036 | 2/1965 | Spooner | 297/256 |
| 3,243,230 | 3/1966 | Otto | 297/184 |
| 3,828,994 | 8/1974 | Hollins | 297/255 X |
| 4,215,900 | 8/1980 | Coult | 297/254 |
| 4,293,162 | 10/1986 | Pap et al. | 297/184 |
| 4,295,481 | 10/1987 | Gee | 297/184 X |

*Primary Examiner*—Kenneth J. Dorner
*Assistant Examiner*—Laurie K. Cranmer
*Attorney, Agent, or Firm*—Linval B. Castle

[57] ABSTRACT

An adjustable awning attachable to the top of an automobile headrest and pivotable from a lockable vertical position to a horizontal position for protecting an infant in a bassinet beneath the awning from rays of the sun. The pivotable awning is on a rectangular frame that is pivoted at one end to a second frame with an arcuate upper end that hooks over the top of the auto backrest. A limiting chain is used to limit the amount of downswing of the pivoting awning and a dependable lock secures the awning frame in its upward position.

7 Claims, 2 Drawing Sheets

SAFETY AUTO SEAT MOUNTED ADJUSTABLE BABY BASSINET SUNSHADER

BRIEF SUMMARY OF THE INVENTION

This invention relates to sun shaders and particularly to an adjustable hood on a frame suspended from the backrest of an auto seat for protecting a baby in a bassinet on a car seat.

For safety purposes, it is vital that an automobile driver and the passengers be secured by proper safety belts. In those instances when a mother must take her infant baby in the car with her and is thus unable to personally hold the baby, it is necessary to secure the baby in a bassinet type basket which is, itself, safety belted to the car seat backrest to prevent sliding during rapid or emergency deceleration. The sunshader of the invention is suspended from the seat backrest and may be pivoted downward to provide an awning for protecting the infant from the direct rays of the sun.

Briefly described, the sunshader includes a hook shaped supporting frame that may be hooked over or removably coupled to either the front or the rear set backrest to lie flat against the backrest. Pivotally coupled to the supporting frame is a second frame which is covered with a suitable shading netting or material. The sunshader includes means for locking the second frame in an upright position and full adjustments for the proper positioning of the shade over the bassinet.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
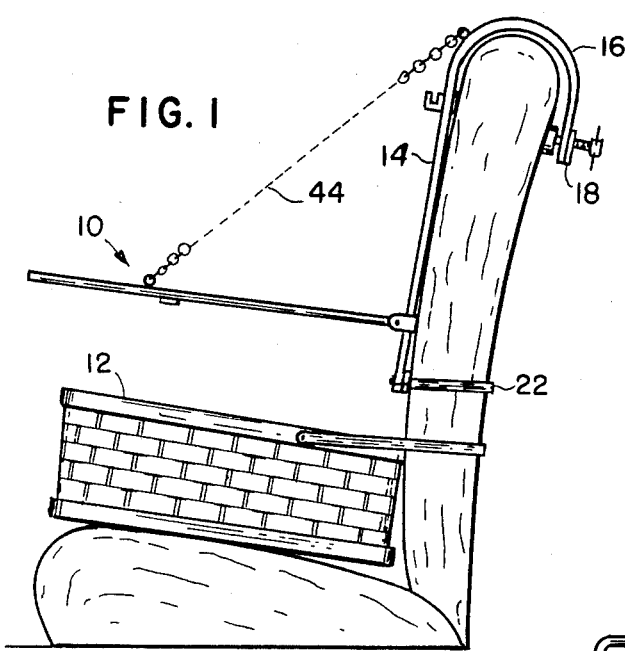
FIG. 1 is a side view of my sunshader shown attached to a seat backrest and positioned to shade a bassinet on an auto seat.
Figure 4:
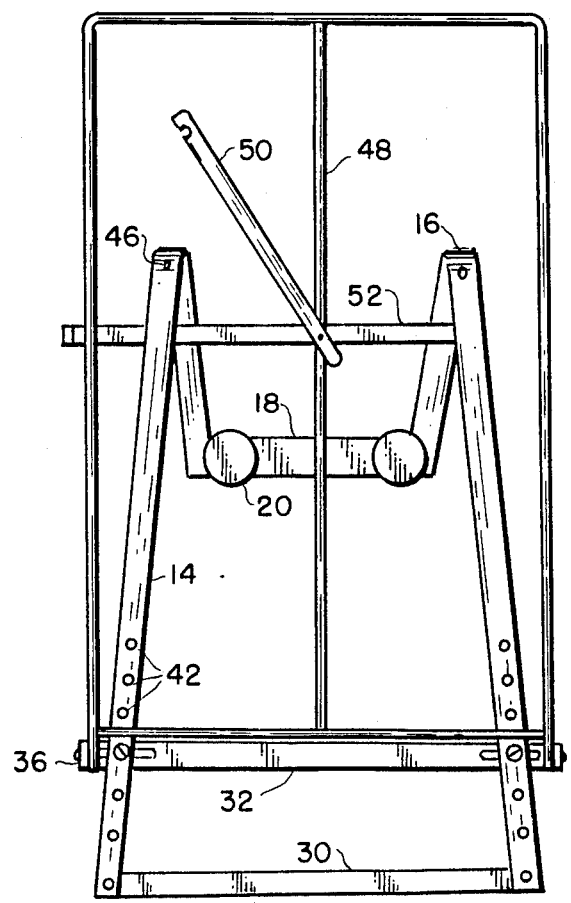
FIG. 4 is an elevational view of the frames without any sunshader fabric taken along the lines 4—4 of FIG. 3.

The side elevational view of FIG. 1 illustrates the sunshader 10 of the invention suspended over a basket or bassinet 12 safety belted to an automobile seat to prevent its sliding during deceleration of the automobile. The sunshader includes a frame 14 that is preferably formed of a thin metal and which has an arcuate top portion 16 which forms a hook that may extend over the top of an automobile seat backrest for suspending the sunshader therefrom. As shown in FIG. 4, the two sides of the frame 14 are slightly tapered together so that the top portions may closely straddle an auto headrest that may extend above the backrest.

If the sunshader is to be used on an automobile front seat backrest, a cross brace 18 is preferably attached to the ends of the arcuate portions 16 to support a threaded clamping member 20 which may be manually tightened against the rear surface of the seat backrest to secure the frame 14 to the backrest. In addition, the lower end of the frame 14 is preferably secured to the backrest by a strap 22 which is hooked into one of several holes through the lower end of the frame and which encircles a bucket seat backrest to further secure the frame to the backrest.

Figure 2:
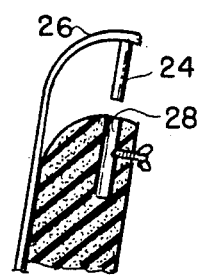
FIG. 2 illustrates a portion of the sunshader frame having a vertical shaft for inserting into a mating opening in the top of a seat headrest.

If the backrest is to be used on a backrest having vertical holes in the top for mounting an adjustable headrest, the embodiment illustrated in FIG. 2 may be employed. In this configuration, end portions of the arcuate end 16 are cut off and shafts 24 are radially attached to the remaining arcuate portions 26 for inserting into the vertical holes 28. Vertical adjustment of the frame is then possible by locking the vertical position of the shafts 24 in the holes 28.

If the backrest is to be used on a rear seat backrest, it is only necessary to remove the clamping member 20 from the frame and to hang the arcuate end 16 of FIG. 1 over the top of the rear seat backrest.

Figure 3:
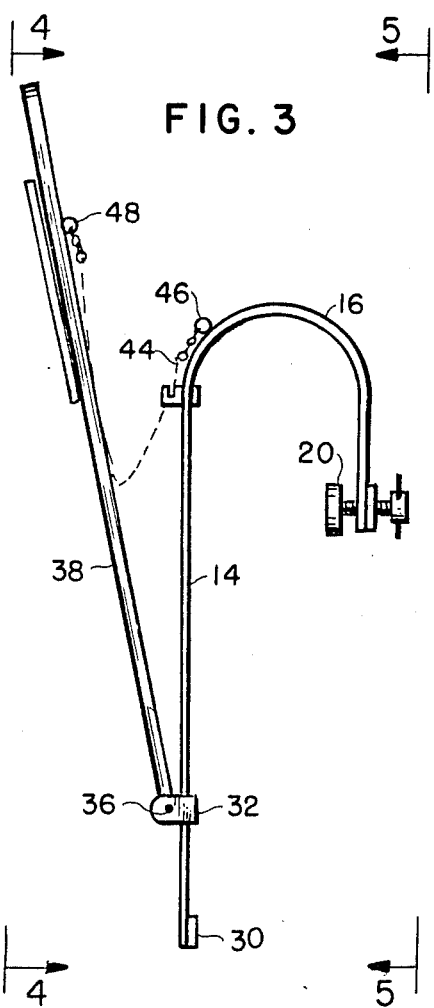
FIG. 3 is a side elevational view of the sunshader pivoted to a near upright position.
Figure 5:
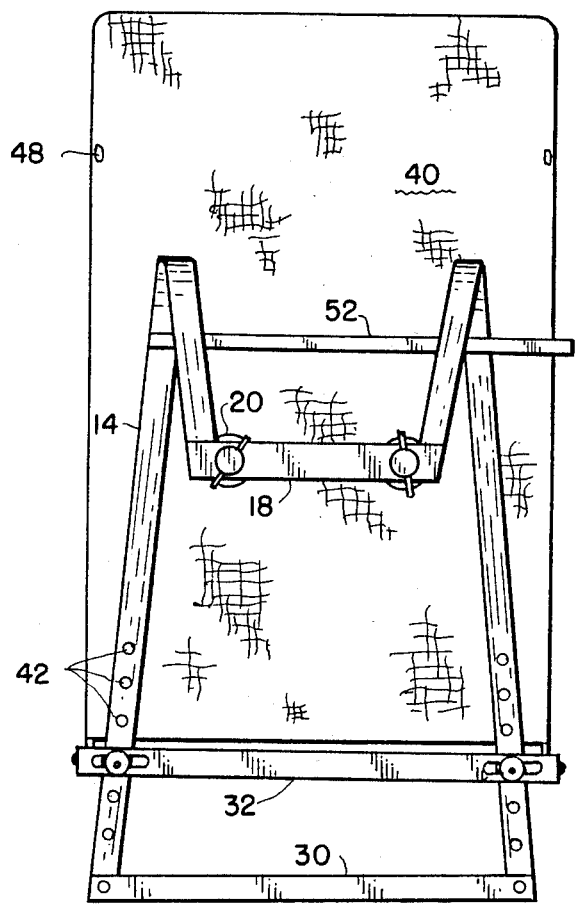
FIG. 5 is an elevational view of the sunshader with attached sunshader material taken along the lines 5—5 of FIG. 3.
Figure 6:
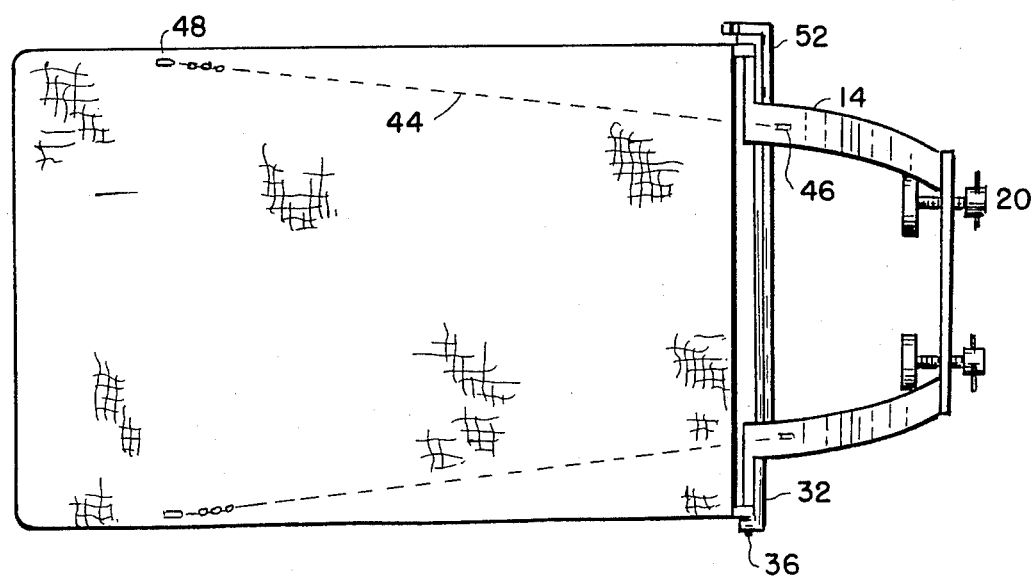
FIG. 6 is a top plan view thereof.

As shown in FIGS. 4–5, the frame 14 is braced at its lower end with a strengthening crossbar 30 and includes a second cross member 32 which contains longitudinal end slots that engage one of a plurality of holes through the frame 14 so that the cross member is vertically adjustable along the frame. As best shown in FIG. 3 and the top plan view of FIG. 6, the end of the cross member 32 are bend forward and provide a pivot 36 for supporting a pivotable sunshader frame 38 which, as shown in FIGS. 5 and 6 is covered with a suitable fabric or shading material 40 for sun protection when lowered as shown in FIG. 1.

Referring again to FIG. 1, a basket 12 beneath the sunshader 10 must have suitable headroom for the physical protection of a baby in the basket; if too low, the baby may sit up and hit the sunshader frame; if too high, there's no protection from the sun. Thus, the sunshader frame 38 should be vertically adjustable along the frame 14. This is achieved by adjusting the vertical position of the cross member 32 in one of several screw holes 42 in the frame 14 as shown in FIGS. 4 and 5. Vertical adjustment of the cross member 32 necessarily requires readjustment of the angle between frame 14 and the sunshader frame 38 to maintain the sunshader frame nearly horizontal or parallel with the basket 12. This adjustment is made by adjusting the length of a light metal chain 44 extending from a connector 46 near the top of the arcuate section 16 of each side leg of the frame 14 to a second connector 48 on the sunshader frame 38.

When it is desired to deposit baby into, or remove baby from the bassinet 12, it is very important that the sunshader be safely pivoted up and securely locked in that "up" position to prevent possible injury. Thus, the sunshader frame 38 includes a longitudinal member 48 to which is pivoted a locking arm 50 as best shown in FIG. 4. The outer end of the locking arm 50 is formed to cooperate with a latch arm 52 which is attached to the stationary side members of the frame 14. In normal use, the locking arm 50 lies substantially against the longitudinal frame member 48 but, when the sunshader is pivoted up, the locking arm 50 is pivoted so that its end engages the bent end of the latch arm 52 thereby to lock securely the sunshader frame against any possible lowering.

I claim:

1. An adjustable hood for shielding an infant on an automobile seat from sun rays, said hood including:

a first frame having two side members having upper and lower ends, said ends being connected together by upper, lower and third cross members, said third cross member being adjustable coupled along a portion of said two side members;

means located at the upper ends of said two side members for removably securing said frame to the top of an automobile seat backrest;

a second frame having first and second sides and first and second ends, said second frame being substantially covered with sun ray protecting material, said first end of said second frame being pivotally coupled to said adjustable third cross member on said first frame to enable upward and downward rotational movement of said second frame;

limiting means for adjustably limiting the amount of downward rotational movement of said second frame from said first frame; and locking means including a manually operable latch cooperating between said first and second frames for securing said second frame substantially flat against said first frame.

2. The hood claimed in claim 1 wherein said locking means includes a locking arm having a first end pivoted to said second frame and a second end engagable with a latching arm connected to said first frame.

3. The hood claimed in claim 2 wherein said locking arm is pivoted to a centrally located member in said second frame and positioned parallel with the sides of said second frame.

4. The hood claimed in claim 2 wherein the upper ends of said two side members of said first frame are arcuate to hook over the top of the automobile seat backrest.

5. The hood claimed in claim 4 further including a screw clamp in the arcuate end of each of said two side members for securing said first frame to said automobile backrest.

6. The hood claimed in claim 5 wherein the two side members of said first frame are tapered together at their upper ends for closely straddling a headrest extending above the automobile backrest.

7. The hood claimed in claim 6 further including belt attaching means at the lower ends of said two side members of said first frame for attachment of a belt around the automobile backrest to secure the lower end of said first frame.

* * * * *